United States Patent Office 3,838,175
Patented Sept. 24, 1974

3,838,175
PROCESS FOR THE PRODUCTION OF HARDEN-
ABLE CYCLOALIPHATIC GLYCIDYL ETHERS
Clau Berther, Chur, Grisons, Manfred Wenzler, Ems,
Grisons, and Hans-Joachim Schultze and Manfred
Hoppe, Chur, Grisons, Switzerland, assignors to In-
venta A.G. fur Forschung und Patentverwertung,
Zurich, Switzerland
No Drawing. Filed Feb. 1, 1971, Ser. No. 111,740
Claims priority, application Switzerland, Feb. 6, 1970,
1,711/70
Int. Cl. C07d 1/04, 1/18
U.S. Cl. 260—348 R                           1 Claim

ABSTRACT OF THE DISCLOSURE

An epihalohydrin is reacted with a mixture of isomeric cyclododecanediols in the presence of a Lewis acid. The reaction product is dehydrohalogenated with alkali. The dehydrohalogenated reaction product, when hardened, suprisingly shows superior arc and surface leakage current strength as compared with conventional hardened epoxy resins. The mixture of isomeric cyclododecanediols preferable has a diol content of 95–100% by weight.

---

The present invention relates to new hardenable cycloaliphatic glycidyl ethers, a process for their production, a process for hardening them with conventional hardeners by known methods, and to the polymeric compounds thus hardened.

It is known that epichlorhydrin or a dihalohydrin will react in the presence of an alkali with a mono- or polynuclear bis- or poly-phenol, in particular p,p'-dihydroxy-diphenyl-dimethylmethane, to produce technically valuable condensation products. These condensation products contain more than one epoxy group in their molecules. They can be hardened by addition of a basic, acidic or catalytic hardener at either low or high temperature. When hardened, these compounds constitute infusible and insoluble synthetic resins. Their properties make them especially suitable as casting or impregnating resins in the electrical industry, as adhesives and as protective coatings.

These polyphenol-based glycidyl ethers are not suitable for use in the field of electric insulators. They have limited surface leakage current strength and arc stability. This results in the adverse effect of chalking out and yellowing. In an effort to avoid the above recited disadvantages, non-phenolic compounds containing epoxy groups, such as cycloaliphatic glycidyl esters or the compounds obtained by epoxidation of cyclo-olefinic ring systems or aliphatic olefins by means of per-acid have been used. While these compounds do not have the aforementioned disadvantages, they are too expensive for many technical applications. The use of diglycidyl ethers of aliphatic and cycloaliphatic polyols has also been proposed. However, even after a thorough hardening with suitable hardening agents, such compounds exhibit instability in shape at high temperature.

It has now been found that technically valuable, hardenable cycloaliphatic glycidyl ethers with more than one epoxy group per molecule can be obtained by a technically simple process. According to the process of the present invention, an epihalohydrin, in particular epichlorhydrin, is reacted with a cyclo-aliphatic diol in the presence of a Lewis acid. If a mixture of isomeric cyclododecanediols is used as the cyclo-aliphatic diol, the resultant reaction product is subjected to dehydrohalogenation. The content of cyclododecanediols should be from 95–100%.

Advantageously one may utilize a mixture of isomeric cyclododecanediols obtained as a by-product in the laurin-lactam synthesis by air oxidation of cyclododecane. The preferred Lewis acid is boron trifluoride etherate. Advantageously, in the first step, epichlorhydrin is reacted in the presence of $BF_3$ etherate with the mixture of the isomeric cyclododecanediols. In the second step the reaction product obtained in the first step (chlorhydrin ether) is dehydrochlorinated with aqueous alkali. These steps are illustrated by the following reaction scheme.

STEP 1

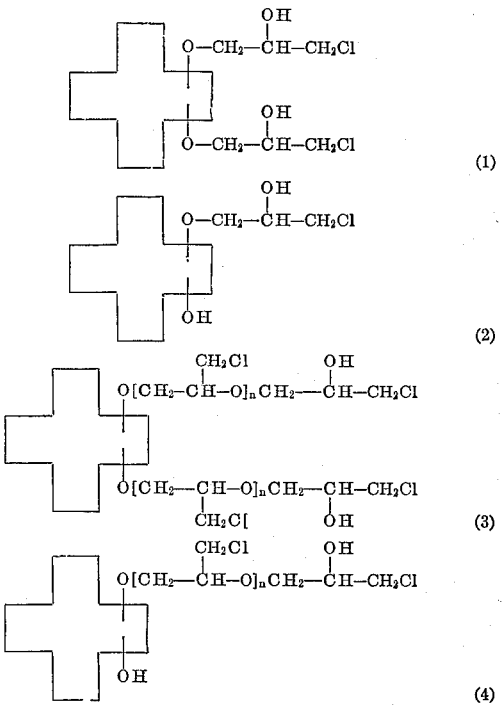

STEP 2

+2NaOH

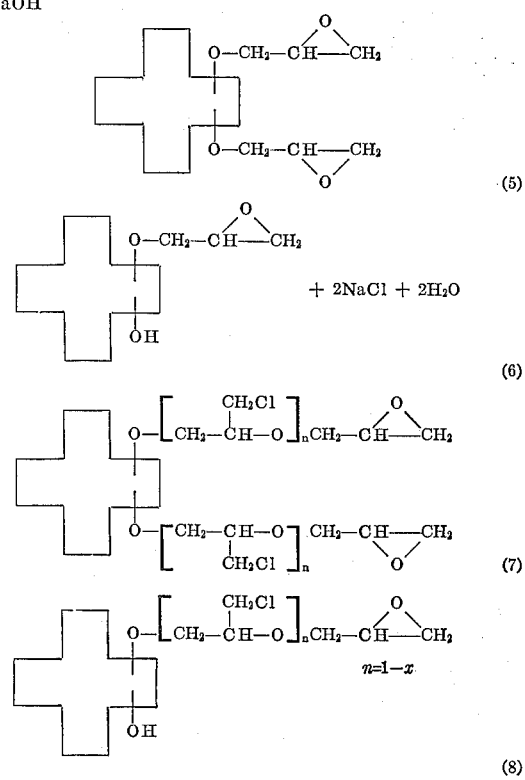

+ 2NaCl + 2H₂O

Based on the starting materials, at a yield of 95–100% there are obtained, without additional purification, conversions of about 72–75% of pure diglycidyl ether. This indicates that the reaction proceeds preferentially according to reactions (1) and (5). The cycloaliphatic glycidyl ethers thus obtained are colorless liquids. They are slightly viscous at room temperature and have a viscosity range of 700–850 cp. at 25° C. and an epoxy group content of 0.46–0.48 per 100 g. of product. In processing and hardening with the commonly employed hardening agents for epoxy resins, the cycloaliphatic glycidyl ethers of the present invention behave analogously to the polyphenol-based conventional glycidyl ethers. Products having very good mechanical properties, excellent surface leakage current, arc strength and UV stability are obtained.

The mixture of isomeric cyclododecanediols used in the process of the invention is obtained in the production of cyclododecanone/cyclododecanol by air oxidation of cyclododecane. The cyclododecane oxidation mixture is separated in the usual manner by distillation from the cyclododecanol/one mixture. The remaining residue is further distilled at as high as possible a vacuum and separated from the resins and non-volatile products. The crude distillate thus obtained is separated in a fractionating column. The main fraction is collected at 20 mm. Hg, between 190° and 220° C. This product, which is used for the production of the claimed new hardenable glycidyl ethers, consists of a mixture of the isomeric cyclododecanediols and advantageously exhibits a diol content of 95–100%. Compared with previously used aliphatic and cycloaliphatic diols, the material obtained in this manner constitutes an extremely inexpensive starting product for the production of epoxy resins, which, surprisingly, despite the complex isomeric distribution, shows excellent mechanical and electrical properties as well as outstanding weathering and UV stability.

To produce high molecular weight resins for use as binders for surface protectants, the isomeric cycloaliphatic glycidyl ethers of the present invention can be reacted with bisphenols, amides or dicarboxylic acids or their anhydrides in stoichiometric ratios. If excellent UV stability is sought, dicarboxylic acids or their anhydrides should be used. The hardening of the high molecular weight glycidyl ethers can be effected with any of the hardening agents commonly used in the hardening of epoxy resin lacquers, or by combination with urea-formaldehyde resins, melamine resins, acrylic resins, etc. and then baking. Alternatively, an esterification with unsaturated air-drying fatty acids can be employed followed by oxidizing drying.

Further, the isomeric cycloaliphatic glycidyl ether mixtures of the present invention can be mixed in any desired ratios with conventional epoxy resins. Thus it is possible to adapt the composition to the particular application contemplated.

The following examples are offered for the purpose of illustrating the process of the present invention and not for the purpose of limiting same.

EXAMPLE 1

400 parts of benzene are charged into a reaction vessel, equipped with an agitator, a reflux condenser, a thermometer and a dropping funnel, 200 parts by weight (1 mole) of a mixture of isomeric cyclododecanediols are dissolved in the benzene by heating to about 80° C. 1 ml. of $BF_3$ etherate (48%) is then added. The temperature is maintained at about 80° C. and 185 parts by weight (2 moles) of epichlorhydrin are then added while agitating intensively. After completion of the addition of epichlorhydrin, the reaction mixture is stirred for another 30 minutes at 80° C. The catalyst is then neutralized with soda lye. The benzene is distilled off and the resultant residue is admixed at 60° C. with 400 parts by weight (2.2 moles) of 22% soda lye. The heterogeneous mixture is then heated to 105° C. with intensive agitation. The stirring is maintained for another 1 hour at this temperature. When the agitator is turned off, two phases form immediately. The lower aqueous layer, consisting of a saturated sodium chloride solution and excess alkali, is separated off. Then the alkali still contained in the organic layer is neutralized with 10% sulfuric acid to pH 7. The residual water content is removed under vacuum, and the residue is filtered through a filter aid at about 50° C. 295–312 parts by weight, corresponding to a yield of 95–100%, of an isomeric glycidyl ether mixture are obtained. Its properties were as follows:

Epoxy number [1] _____ 0.462–0.474 (corresponding to 72–74% of the theorectical amount based on pure diglycidyl ether).
Epoxy equivalent _____ 210–216.
Specific gravity at 20° C. __ 1.081.
Viscosity at 25° C. _____ 700–850 cp.
Color index according to Gardner _____ <1.
Total chlorine content _____ <5% (by weight).
Hydrolyzable chlorine _____ <0.3% (by weight).
Water content _____ <0.3% (by weight).

[1] Number of epoxy groups per 100 g. of product.

TABLE

Mechanical and electrical properties of the isomeric glycidyl ether mixture according to the invention with different hardeners after complete hardening Resin as per Example 1

| Hardener | MNA* | MNA | PSA | PSA | TETA* |
|---|---|---|---|---|---|
| Resin/hardener ratio in parts by weight | 100:83.5 | 100:83.5 | 100:69 | 100:69 | 100:11.4. |
| Fillers | | 300 p. quartz-meal | | 300 p. quartz-meal | |
| Processing temperature | 80° C | 80° C | 120° C | 120° C | Room temp. |
| Processing time | 70 min | 90 min | 240 min | 240 min | 77 min. |
| Tensile strength (VSM 77101) kp./cm.$^2$ | 720 | 690 | 820 | 700 | 680. |
| Bending strength at rupture (DIN 53452) kp./cm.$^2$ | 840 | 820 | 930 | 1,040 | 1,130. |
| Impact tenacity (DIN 53453) cm. kp./cm.$^2$ | 20 | 7 | 19 | 10 | 12. |
| Shore hardness D at 20° C | 87 | 94 | 87 | 93 | 86. |
| Modulus of elasticity (calculated from the flexure at 4 mm.) kp./cm.$^2$ | $29.5\times10^3$ | $88.5\times10^3$ | $28\times10^3$ | $90.5\times10^3$ | $28\times10^3$. |
| Rel. dielectric constant at 50 Hz | 3.0 | 3.6 | 3.3 | 3.6 | 3.0. |
| Dielectric loss factor tan delta at 20° C: | | | | | |
| 50 Hz | $0.3\times10^{-2}$ | $1.6\times10^{-2}$ | $0.4\times10^{-2}$ | $1.9\times10^{-2}$ | $0.9\times10^{-2}$. |
| 1,000 Hz | $0.6\times10^{-2}$ | $0.9\times10^{-2}$ | $0.6\times10^{-2}$ | $0.9\times10^{-2}$ | $1.7\times10^{-2}$. |
| Specific volume resistance at 1,000 v., Ohm cm | $4.3\times10^{12}$ | $4.1\times10^{12}$ | $3.2\times10^{12}$ | $4.2\times10^{12}$ | $3.5\times10^{12}$. |
| Surface leakage current strength (VDE 0303/1) | Grade KA3c | Grade KA3c | Grade KA3c | Grade KA3c | Grade KA3c. |
| Arc strength (VDE 0303/5) | L 4 | L 4 | L 4 | L 4 | L 4. |
| Breakdown voltage, kv./cm. (voltage increase, 2 kv./sec.) | 220 | 235 | 215 | 215 | 230. |

Symbols used in the table:
*Methylnadic acid anhydride.
**Phthalic acid anhydride.
***Triethylene tetramine.

It is evident from the preceding table that in addition to good mechanical properties, excellent electrical properties are obtained when the mixture of isomeric glycidyl ethers of the instant invention is hardened with hardening agents common for epoxy resins, such as methylnadic acid anhydride, phthalic acid anhydride and/or triethylene tetramine. In particular, their arc and surface leakage current strength are superior to that of the conventional epoxy resins, e.g., on a basis of epichlorhydrin and p,p'-dihydroxydiphenyldimethylmethane.

EXAMPLE 2

To produce a high molecular weight glycidyl ether, 100 parts by weight of the mixture of isomeric glycidyl ethers obtained according to Example 1 are heated to 130° C. with 17 parts by weight of cis-hexahydrophthalic acid under agitation and in the absence of air. 0.03 part by weight of benzyl trimethyl ammonium chloride is added, then the temperature is brought up to 160° C. The reaction mixture is stirred for another 60 minutes at this temperature. After cooling to room temperature, a colorless resin with an epoxy group content of 0.201 per 100 g. and an acid number of zero is obtained. When this resin was combined with ethylene diamine, as a hardening agent, excellent protective coatings, which showed no yellowing after exposure under a UV lamp for 72 hours, were obtained. Similar protective coatings, produced from a conventional epoxy resin and based on epichlorhydrin and p,p'-dihydroxy-diphenyl-dimethylmethane using the same hardening agent, showed intensive yellowing after the same exposure.

What is claimed is:
1. A hardenable cycloaliphatic glycidyl ether having more than one epoxy group in its molecule, the ether being prepared by reacting an epihalohydrin with a cycloaliphatic diol in the presence of a Lewis acid to produce a reaction product, and contacting the reaction product with an alkali to dehydrohalogenate said reaction product, the cycloaliphatic diol being a isomeric mixture of cyclododecane diols obtained as a by-product in the production of cyclododecanone/cyclododecanol by air oxidation of cyclododecane.

References Cited
UNITED STATES PATENTS

| | | | |
|---|---|---|---|
| 2,898,349 | 8/1959 | Zuppinger et al. | 260—348.6 |
| 3,298,981 | 1/1967 | Fry et al. | 260—18 |
| 3,351,574 | 11/1967 | Hicks et al. | 260—18 |
| 3,470,110 | 9/1969 | Renner | 260—2 |

NORMA S. MILESTONE, Primary Examiner

U.S. Cl. X.R.
260—2 EP, 348.6